Oct. 25, 1927.

H. C. VANCE 1,647,064

HAY PILER

Filed Oct. 4, 1923

INVENTOR
H. C. Vance,

BY

ATTORNEYS

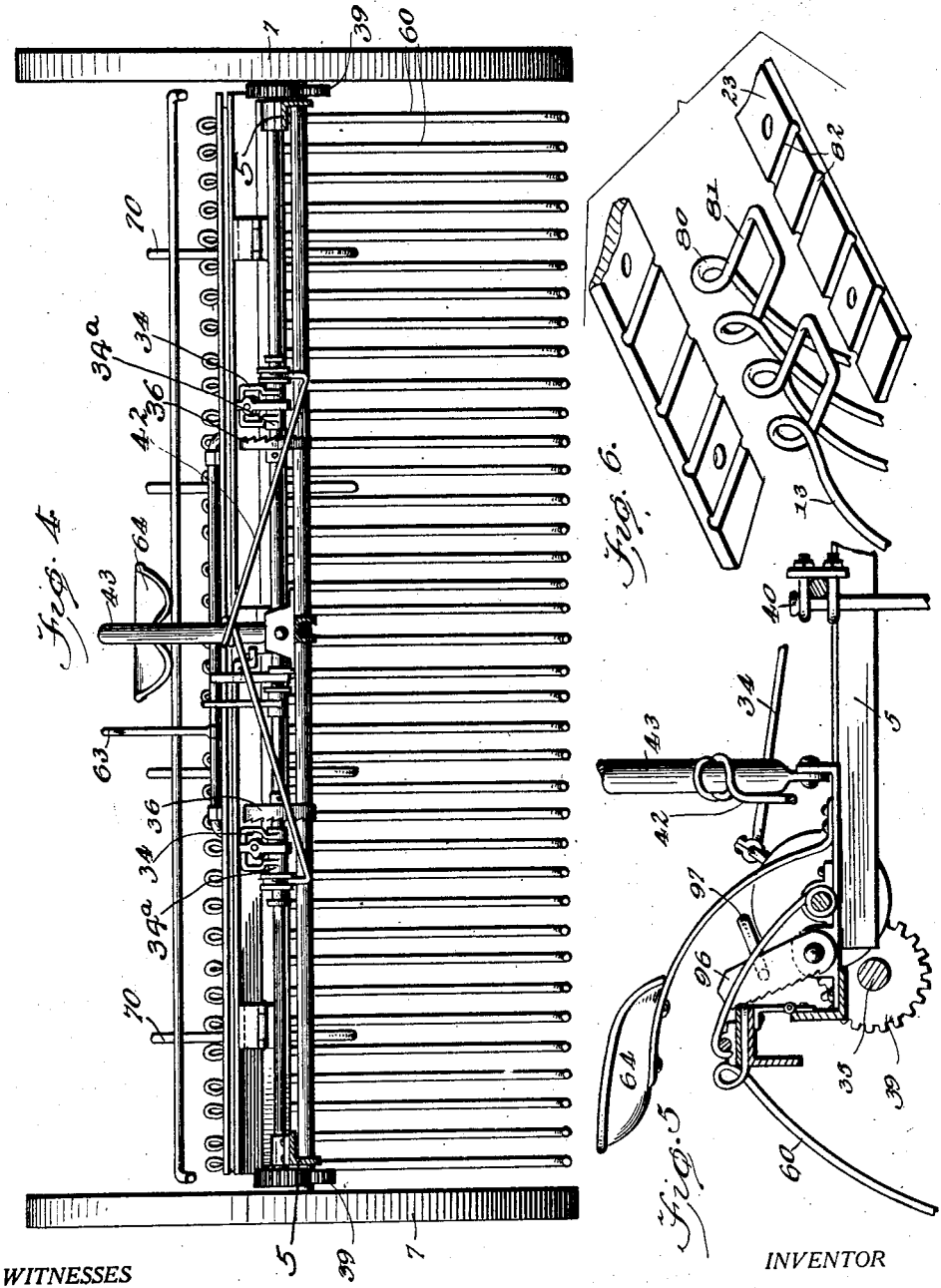

Patented Oct. 25, 1927.

1,647,064

UNITED STATES PATENT OFFICE.

HAZEN CAMMELLUS VANCE, OF BOISE CITY, IDAHO.

HAY PILER.

Application filed October 4, 1923. Serial No. 666,603.

This invention relates to agricultural machines and more particularly to a machine for collecting and piling hay and the like.

Briefly stated an important object is to provide a hay piling machine having means to collect hay in separate swaths in such a manner that the hay in one swath is not mixed with the hay in another swath.

Another object is to provide a hay piling machine having separate advance rakes which act as collecting and pick up members and which are periodically dumped into the secondary rake which is in turn dumped for discharging the collected hay.

Also the invention aims to provide a hay collecting and piling machine having simple means whereby the advance rakes are held against accidental dumping.

A further object is to provide a hay collecting and piling machine having simple means whereby the collected hay is prevented from rolling or tipping forward prior to being intentionally dumped.

A further object is to provide a machine of the character specified which is entirely under the control of one operator, which is durable in use and cheap to manufacture.

Other objects and advantages will be apparent during the course of the following description.

In the accompanying drawings, forming a part of this application and in which like numerals are employed to designate like parts throughout the same, Figure 1 is a plan view of the improved machine.

Figure 4 is a transverse sectional view taken on line 4—4 of Figure 1.

Figure 5 is a detail sectional view taken on line 5—5 of Figure 1.

Figure 6 is a fragmentary perspective illustrating the attaching means for the rake.

Figure 1:
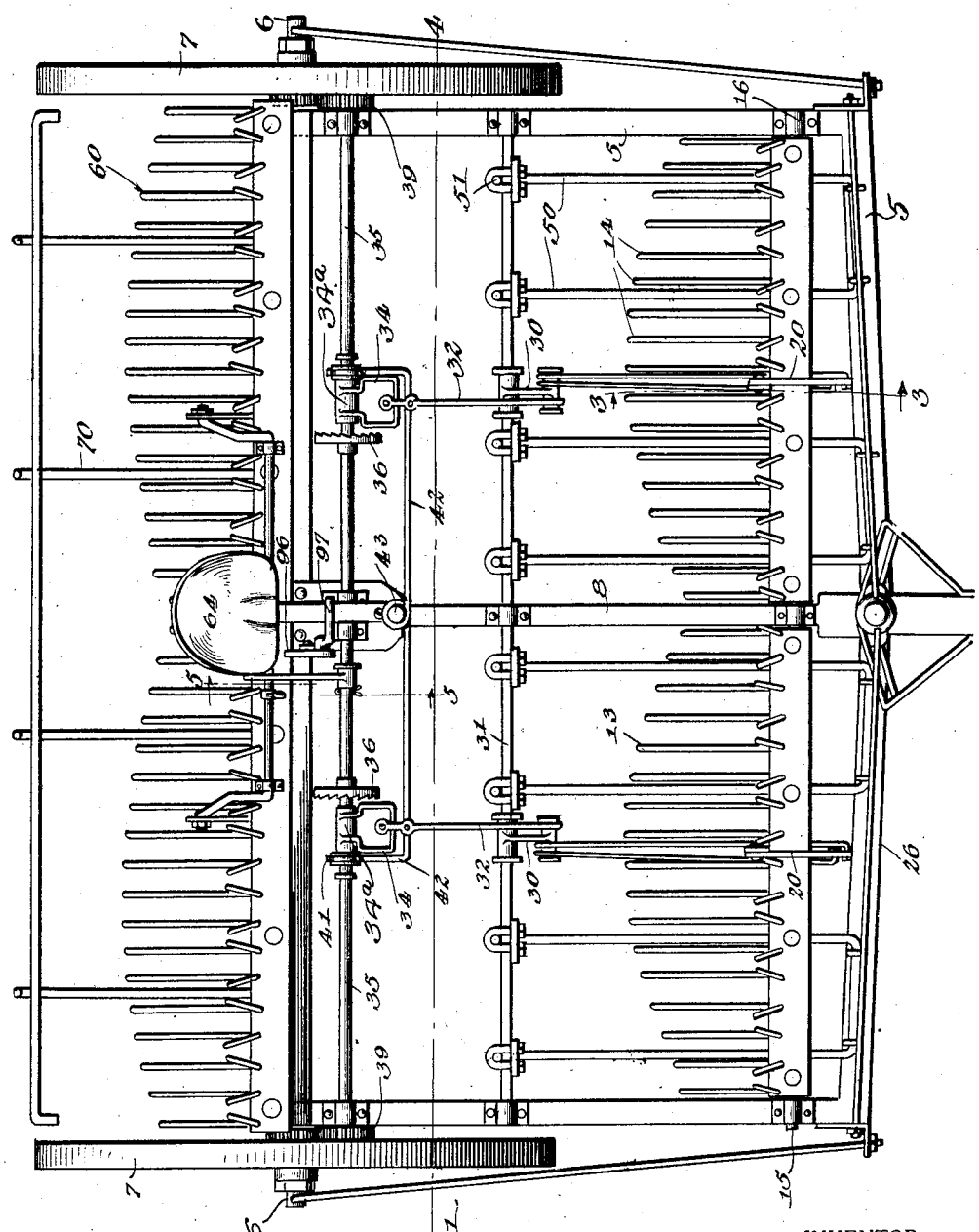
Figure 2:
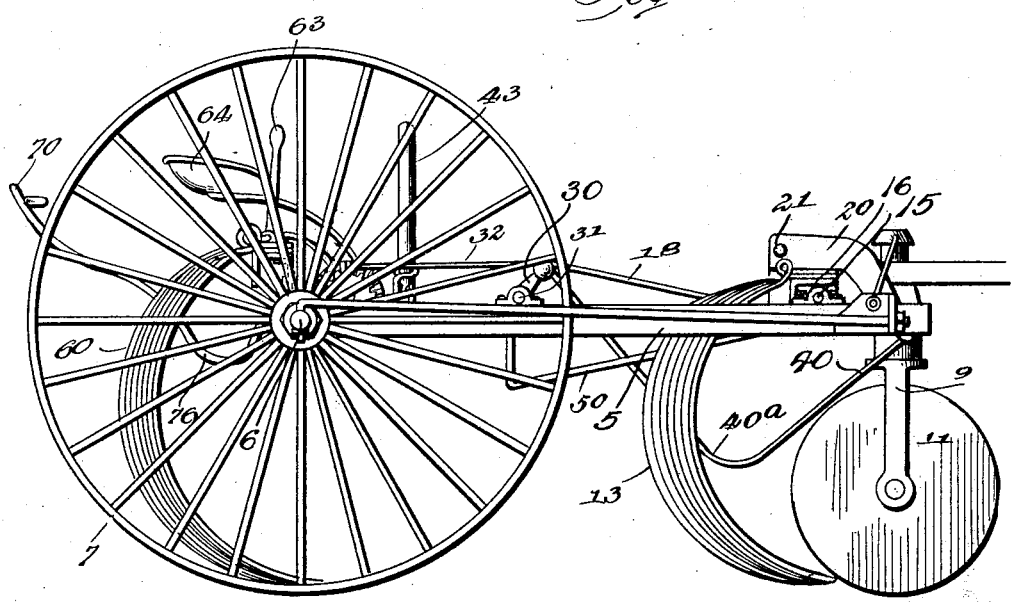
Figure 2 is a side elevation of the same.

In the drawing wherein for the purpose of illustration is shown a preferred embodiment of the invention the numeral 5 designates a frame having axles 6 upon which wheels 7 are mounted. The frame is, as illustrated in Figures 1 and 2 provided with a central beam 8 having a fork 9 depending therefrom and having connection with a wheel 11. The wheel 11 is designed to move between the rows of cut hay, while the wheels 7 are designed to straddle the rows.

With reference to Figure 1 it will be observed that the forward portion of the frame is provided with separate and independent rakes 13 and 14 rotatably connected to the frame by means of a shaft 15. The shaft 15 is extended entirely across the front of the frame and is secured to the side members of the same and to the center beam 8 by means of bearing caps 16. However, each rake is independent of the other rake and they are preferably dumped at different times by means to be later described.

Each rake is provided with longitudinally curved teeth so arranged that the hay upon being collected is directed toward the center of the rake. More specifically the intermediate or inner teeth of each rake are formed with greater curve and are longer than the outer teeth and this forms a pocket of an increased depth at the center of the rake. By reason of this construction the hay in one swath is prevented from mixing or becoming entangled with the hay in the adjacent swath.

As the machine travels along the two rakes 13 and 14 will collect the hay and the rakes may be dumped when desired through the medium of a link connected at its forward end to an approximately L-shaped locking bar 20 upon each of the rakes. The locking bar 20 is pivoted as indicated at 21 to an ear 22 secured to the intermediate portion of a rake and it will be seen that when a rearward pull is exerted on the link 18 in the direction of arrow $a$ the L-shaped locking bar 20 will rock the associated rake by virtue of bearing down upon the head 23 so that the hay carried thereby will be dumped. One of the branches of the L-shaped locking bar 20 is extended over the head 23 of the rake and it might be said that the head 23 forms a fulcrum for the bar.

Figure 3:
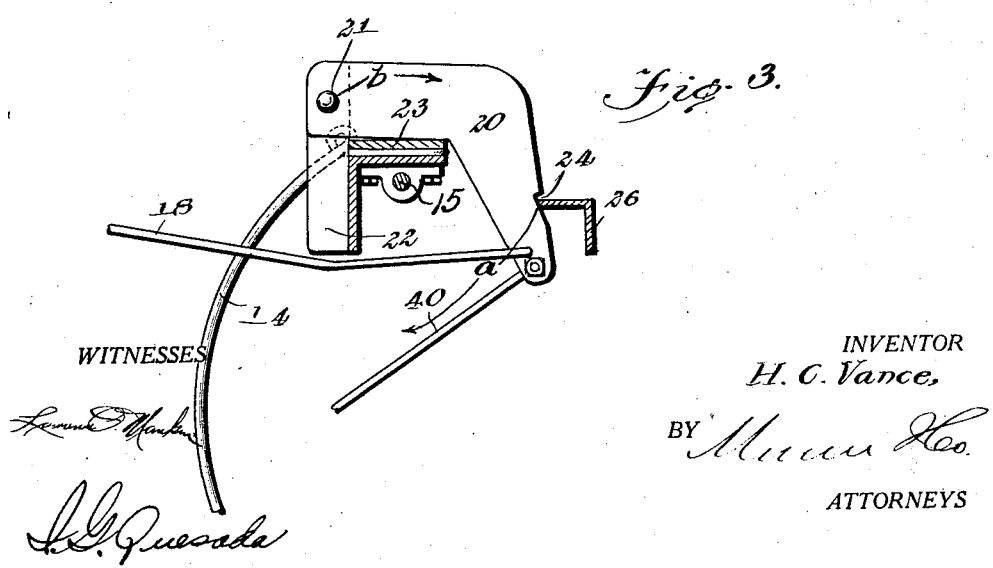
Figure 3 is a detail transverse sectional view taken on line 3—3 of Figure 1.

The locking bar 20 is as illustrated in Fig. 3 provided with a notch 24 which is arranged to bear upon the adjacent edge of the front cross piece 26 of the frame and thus prevent the rake from accidentally dumping when encountering an obstruction upon the field. In such event a swinging motion of the rake 14 (Fig. 3) and head 23 occurs in the general direction of the arrow $b$, the shaft 15 constituting the fulcrum. The link 18, however, offers rigid resistance to any corresponding swinging motion of the lower end of the locking bar in the direction of arrow $a$, thereby imposing the square end of the notch 24 upon the cross piece and preventing the dumping mentioned. But the aforesaid pull upon the link 18 swings the locking bar in the direction of arrow *a* so that the notch 24 clears the crosspiece 26 and a turn of the rake upon the shaft 15 can result without impediment. However, when a rearward pull is exerted on the link 18 the L-shaped bar 20 moves rearwardly and is released from locking engagement with the cross piece 26 and the rake may be moved to its discharge position without delay or interference by the cross beam 26.

The rear portion of the link 18 is as illustrated in Figure 1 connected to the head of the crank 30 mounted upon a cross rod 31. The crank 30 is in turn operated by a link 32.

In carrying out the invention the rear portion of the link 32 is connected to a combined crank and clutch section 34 slidably mounted upon a drive shaft 35. The section 34 is adapted to cooperate with a ratchet wheel 36 rigidly mounted on the drive shaft 35. The clutch section resembles a U-shaped yoke, the side nearest the adjacent ratchet being engageable with the ratchet teeth thus constituting an element of a clutch. More specifically when the combined crank and clutch section 34 is moved into clutched engagement with the teeth on the adjacent side of the ratchet wheel 36 the section 34 turns rearwardly with the shaft 35 pulling the links 18 and 32 rearwardly and elevating the associated rake by virtue of the pull upon the locking bar in the direction of arrow *a* (Fig. 3). However, the clutch section 34 is allowed to remain in engagement with the ratchet wheel 36 only long enough to dump the hay or other material collected by one of the advance rakes. When the hay has been dumped the section 34 is released from engagement with the wheel 36 by manual movement of the handle 43 and the associated advance rake is returned to its original position by gravity.

The clutch members formed by the elements 34 and 36 and associated parts are two in number and each is mounted on the shaft 35. Figure 1 plainly illustrates that trains of gears 39 establish a driving connection between the shaft 35 and the wheels 7.

Each clutch section 34 includes a grooved sleeve 34$^a$ for the reception of the forked end 41 of an operating link or rod 42. The intermediate portion of the rod 42 has connection with a handle 43 so that when the handle is rocked in either direction the sleeves 34$^a$ slide upon the shaft 35 correspondingly. This action moves a side of one of the sections 34 into engagement with the adjacent ratchet 36 toward which it was moved, establishing a driving connection. This driving connection causes the corresponding advance rake to move to its dumping position, the other rake remaining undisturbed in its hay collecting position. When the handle is rocked in the other direction said other rake is moved to its hay discharging position and the first rake is allowed to remain in its hay collecting position.

Attention is invited to Figure 2 which illustrates that a substantially L-shaped bar or link 40 is extended through the intermediate portion of each advance rake and is pivotally connected at its forward end to the locking bar 20 and at its rear end to the crank 30 so that it functions more or less the same as the link 18. It includes the shoulder 40$^a$ which checks the hay from rolling or tipping forward when the rake progresses forwardly but displays a pushing action upon the hay when the rake is actuated for dumping, causing the hay to tip backward. This results from the longitudinal rearward movement of the shoulder 40$^a$ when the rake is tilted upward for dumping purposes.

The rakes 13 and 14 operate through a relatively stationary comb 50 consisting of a plurality of parallel teeth, the rear portions of which are connected to the cross rod 31 as indicated at 51 and the forward portions of the teeth forming the comb 50 are rigidly secured to the cross beam of the frame 5. It will be seen that when the rake 13 or the rake 14 is moved to its dumping position the teeth constituting the comb 50 will move the hay from the rake and prevent the hay from being entangled with the teeth of the rake or any part of the machine. In use the relatively stationary comb 50 prevents the hay from crowding at the upper portion of the rake and from rolling or tipping forward in the rake. The teeth forming the comb 50 also serve as a means for strengthening and reinforcing the machine.

The main or secondary rake is generally designated by the numeral 60 and is formed with a plurality of longitudinally curved teeth having what might be said to be a pair of pockets directly behind the rakes 13 and 14 so as to receive the hay collected by the rake. The main or secondary rake extends entirely across the path traveled by the rakes 13 and 14 and is supported for swinging movement about a horizontal axis and when desired the same may be swung to its inoperative position by means of a handle 63 located adjacent the driver's seat 64.

The two pockets in the main rake 60 separately receive the hay collected by the rakes 13 and 14 and consequently the hay in the two parallel swaths are prevented from mixing. The rear rake 60 is provided with a comb 70 consisting of a plurality of teeth which as illustrated in Figure 2 have their forward portions formed with approximately U-shaped bends 76. The U-shaped bends 76 of the rear comb 70 prevent rolling and tipping of the hay backward and when the main rake is moved to its dumping position the combs drag over the dump, causing the hay to tip forward onto the ground which has previously been raked clean by the rakes 13 and 14.

In operation the machine is drawn along by a draft animal or otherwise and the rakes 13 and 14 collect the hay in separate swaths. There are several advantages of collecting the hay in different swaths. The disturbing, rolling or elevating of the hay after it enters the rake is avoided so that every pile can be uniform in size, and every pile will be built in two parts as is done by hand. Raking is also simplified, the strains being equalized particularly in heavy hay. Another advantage lies in this that each hay pile is built in two parts, the pocket-shaped rakes producing an air space under each pile, the hay straws on top all hanging down toward the ground so that it will shed rain, be capable of curing, and yet not scatter in the wind. The rake 13 may first be dumped by establishing a connection between the drive shaft 35 and one of the ratchet wheels 36 and the clutch section 34 whereupon the hay dumped from the rake 13 is immediately collected in one of the pockets of the rear rake 60. When the rake 14 has collected the desired quantity of hay or other material it is dumped and the hay discharged from the rake 14 is collected by the pockets of the secondary rake 60. The machine continues and when the rake 13 has collected a proper quantity of hay it is dumped and the rake 14 is subsequently dumped so that two batches of hay are collected in each pocket of the secondary rake 60. Preparatory to dumping the hay from the rear rake 60 into two separate piles or shocks the ground is cleaned by the advance rakes 13 and 14 so that the hay will finally be dumped on clean ground.

The link 40 is in the position shown in Figure 2 when loading or raking hay. Upon dumping the rake, as by engaging the ratchet 36 and releasing the locking bar 20 (Figs. 2 and 3) at the notch 24, link 40 acts as a comb to keep the hay from crawling up to the base of the rake teeth and keeping it down and in compact formation. As the rake dumps the forward and lower point of locking bar 20 and the upper and forward end of connected link 40 move downward and backward, causing bottom of link 40 to travel backward through teeth of rake. However, the hay is still in the rake until lower end of teeth pass above the level of the lowest point of link 40.

This lowest point moves backward at the same time that the teeth of the rake start to leave the ground and dump, thereby tending to press the hay down and back as the teeth move upward yet carrying the hay forward at the same time when the rake teeth have traveled upward to the limit link 40 at the curve nearest the ground will have traveled backward beyond the original raking position of the teeth.

As to the comb 70: This also acts to keep the hay from pushing up into the base of the teeth 60 when raking and when dumping to comb the hay out of the rake teeth, as they rise to the dumping position. The bends 76 will keep the hay from tipping forward while the rake is traveling forward because as the hay crowds up into the rake the upper part of the pile packs in between the rake teeth and the bend 76. The lower edge of the hay pile will drag on the ground to some extent as the rake moves forwardly and the rake teeth travel upwardly when the rake dumps. The points of the forwardly moving rake teeth will tip the hay pile forwardly until said points pass above the comb 70. The comb 70 will then drag upon the hay pile to complete the desired tipping. The combs are quite necessary to prevent the hay from matting at the base of the rake teeth, and to clear the teeth when dumping.

This cycle of operation is continued until the entire field has been cleaned of hay and it will be seen from the foregoing description that the invention is provided with simple means whereby the hay in one swath is prevented from mixing with the hay in another swath and this greatly facilitates the collection and piling of the hay.

As illustrated in Figure 6 the teeth of the rakes 13 and 14 may be formed from a single length of spring metal provided at spaced points with convolutions or coils 80 and between the coils with U-shaped attaching portions 81 which may be imbedded in transverse grooves 82 in the head 23 of the rake. It will be seen that this method of constructing the rakes is extremely economical and durable.

The rear or main rake is held against accidental dumping by means of a tooth 96 having a foot pedal 97 which may be operated when it is desired to release the toothed arm 96 from engagement with the head of the main rake so that the head may be dumped for discharging the hay.

Having thus described the invention, what is claimed is:—

1. A hay collecting and piling machine comprising the combination of a rake, a locking bar carried by the rake, a link connected with the locking bar for moving the rake to the dumping position, and a second link also in connection with the locking bar having a shoulder formed therein to prevent tipping forward of the hay during collection but displaying a pushing action upon the hay to tip it backward during dumping.

2. A hay collecting and piling machine comprising the combination of a frame, a rake rockably carried thereby, a locking bar carried by the rake having a notch engageable with a cross piece of the frame to prevent accidental dumping upon the encountering of an obstruction by the rake, a link having such connection with the locking bar as to pull the notch clear of the cross piece upon rocking the rake for intentional dumping, and a second link connected to the locking bar adjacent to the place of connection of the first link, said second link having a shoulder in such position as to normally prevent tipping forward of the hay during collection but displaying a pushing action upon the hay to tip it backward during dumping.

3. A hay collecting and piling machine having a frame, a rake rockably mounted on the frame, a comb mounted upon the frame consisting of a plurality of teeth extending between the teeth of the rake, and U-shaped bends formed in the teeth of said comb occupying such position in relation to the rake as to prevent tipping backward of the hay during collection but dragging over the hay when dumped causing the hay to tip forward onto the ground.

4. A hay collecting and piling machine comprising a frame, separate rakes having swinging connection therewith, a locking bar connected to each rake having a notch adapted to engage said rakes whereby the respective rakes are respectively held against accidental dumping, a cross rod connected to said frame, cranks mounted on said cross rods, links connected to said locking bars and to said cranks, a second set of links connected to said crank and clutch elements mounted on said operating shaft, a second set of links connecting said first cranks to said elements, ratchet wheels mounted on said operating shaft, an operating rod having common connection with said elements, and a handle for moving said rods to simultaneously shift said elements in either direction, thereby making alternate clutching engagement with said ratchets to pull first one then the other of the locking bars out of engagement with the frame and causing alternate dumping of the rakes.

HAZEN CAMMELLUS VANCE.